United States Patent
Kim et al.

(10) Patent No.: US 12,319,366 B2
(45) Date of Patent: Jun. 3, 2025

(54) APPARATUS AND METHOD FOR ESTIMATING SPEED OF DC MOTOR IN MOTOR DRIVEN POWER STEERING SYSTEM

(71) Applicant: HYUNDAI MOBIS CO., LTD., Seoul (KR)

(72) Inventors: In Hyuk Kim, Yongin-si (KR); Kyu Ha Kim, Yongin-si (KR); Jeong Hoon Seo, Yongin-si (KR); Hyeon Hee Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 864 days.

(21) Appl. No.: 17/231,308

(22) Filed: Apr. 15, 2021

(65) Prior Publication Data

US 2022/0185365 A1 Jun. 16, 2022

(30) Foreign Application Priority Data

Dec. 16, 2020 (KR) .................. 10-2020-0176565

(51) Int. Cl.
*H02P 27/12* (2006.01)
*B62D 5/04* (2006.01)
*H02P 7/00* (2016.01)
*H02P 23/14* (2006.01)

(52) U.S. Cl.
CPC .............. *B62D 5/0481* (2013.01); *H02P 7/00* (2013.01); *H02P 23/14* (2013.01)

(58) Field of Classification Search
CPC .... H02P 7/00; H02P 23/14; H02P 6/08; H02P 6/18; H02P 21/18
See application file for complete search history.

(56) References Cited

U.S. PATENT DOCUMENTS

| | | | | |
|---|---|---|---|---|
| 2009/0079373 | A1* | 3/2009 | Nagase | B62D 5/0487 318/434 |
| 2012/0268046 | A1* | 10/2012 | Yamazaki | H02P 21/26 318/400.02 |
| 2013/0069572 | A1* | 3/2013 | Maekawa | H02P 6/18 318/400.14 |
| 2014/0062353 | A1* | 3/2014 | Oyobe | H02P 21/22 318/400.02 |
| 2018/0312196 | A1* | 11/2018 | Kim | B62D 6/001 |
| 2019/0023309 | A1 | 1/2019 | Sasaki et al. | |
| 2019/0305706 | A1* | 10/2019 | Kim | H02P 29/024 |

FOREIGN PATENT DOCUMENTS

| | | |
|---|---|---|
| JP | WO2017/043213 A1 | 3/2017 |
| JP | WO2020/032260 A1 | 2/2020 |
| KR | 10-2008-0078441 A | 8/2008 |
| KR | 10-2018-0037030 A | 4/2018 |

OTHER PUBLICATIONS

Korean Office Action issued on Aug. 22, 2022, in counterpart Korean Patent Application No. 10-2020-0176565 (5 Pages in Korean).

* cited by examiner

*Primary Examiner* — Muhammad S Islam
(74) *Attorney, Agent, or Firm* — NSIP Law (57) ABSTRACT

An apparatus with motor speed estimation includes: a motor speed estimator configured to estimate a motor speed based on a DC link voltage for driving a motor, a motor current flowing through the motor, and a voltage command; and a limiter configured to generate a current command based on the estimated motor speed, a torque command, and the DC link voltage.

16 Claims, 9 Drawing Sheets

APPARATUS AND METHOD FOR ESTIMATING SPEED OF DC MOTOR IN MOTOR DRIVEN POWER STEERING SYSTEM

CROSS-REFERENCE TO RELATED APPLICATION

This application claims the benefit under 35 U.S.C. § 119(a) of Korean Patent Application No. 10-2020-0176565 filed on Dec. 16, 2020 in the Korean Intellectual Property Office, the entire disclosure of which is incorporated herein by reference for all purposes.

BACKGROUND

Field

Exemplary embodiments of the present disclosure relate to an apparatus and method for estimating the speed of a DC motor in an MDPS (Motor Driven Power Steering) system, and more particularly, to an apparatus and method for estimating the speed of a DC motor in an MDPS system, which can estimate motor speed using a voltage command and a measured motor current in the MDPS system.

Discussion of the Background

An MDPS of a vehicle serves to provide assist torque in a driver's steering direction by using a motor, thereby lightening handling.

Unlike an existing HPS (Hydraulic Power Steering), the MDPS may automatically control the operation of the motor according to a traveling condition of the vehicle, thereby improving steering performance and steering feel.

The MDPS system uses a DC motor with no position sensor, in order to reduce the manufacturing cost. When there is no position sensor, a method for calculating speed by measuring a change in rotation angle cannot be applied. Thus, a motor speed estimation method capable of substituting the speed calculation method is being developed.

The conventional MDPS system using a DC motor uses a method for estimating motor speed using a voltage across the motor and a measured current.

However, since the conventional MDPS system uses a low-pass filter configured as an analog circuit to measure the voltage across the motor, a cost is incurred for the circuit configuration, and the accuracy of the motor speed estimation is changed depending on pass band settings. Therefore, the MDPS system has difficulties in coping with various operation situations, and the measurement circuit needs to be modified when the pass band is changed.

Furthermore, since the conventional MDPS system performs speed estimation using a speed-voltage-current relation equation in a normal state, the number of errors in speed estimation increases in a section where a current and voltage are rapidly changed.

The related art of the present disclosure relates to Korean Patent Application No. 2008-0078441 published on Aug. 27, 2008 and entitled "Apparatus for Estimating Angular Velocity of DC Motor for use in Electric Power Steering System".

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an apparatus with motor speed estimation includes: a motor speed estimator configured to estimate a motor speed based on a DC link voltage for driving a motor, a motor current flowing through the motor, and a voltage command; and a limiter configured to generate a current command based on the estimated motor speed, a torque command, and the DC link voltage.

The motor speed estimator may include: a dead time voltage calculator configured to calculate a dead time voltage using the voltage command, the DC link voltage, and a motor current; a motor resistance and inductance voltage calculator configured to calculate a motor resistance voltage by resistance of the motor, and calculate a motor inductance voltage by inductance of the motor; and a calculator configured to calculate the motor speed based on the dead time voltage, the voltage command, the motor resistance voltage, the motor inductance voltage, and a preset motor counter electro-motive force constant.

The dead time voltage calculator may include: a dead time voltage limit value calculator configured to calculate a dead time voltage limit value by applying a sign of the motor current, the DC link voltage, and a dead time ratio within a switching period; and a dead time voltage determiner configured to determine a dead time voltage according to states of the dead time voltage limit value and the voltage command.

The dead time voltage limit value calculator may be further configured to calculate the dead time voltage limit value by multiplying the sign of the motor current, the DC link voltage, and the dead time ratio.

The voltage determiner may be further configured to: determine the dead time voltage as a value of the voltage command, in response to an absolute value of the voltage command being less than an absolute value of the dead time voltage limit value; determine the dead time voltage as a positive dead time voltage limit value, in response to the absolute value of the voltage command not being less than the absolute value of the dead time voltage limit value, and both of the voltage command and the dead time voltage limit value being positive numbers; determine the dead time voltage as a negative dead time voltage limit value, in response to the absolute value of the voltage command not being less than the absolute value of the dead time voltage limit value, and both of the voltage command and the dead time voltage limit value being negative numbers; determine the dead time voltage as a positive dead time voltage limit value, in response to the voltage command being a negative number and the dead time voltage limit value being a positive number; and determine the dead time voltage as a negative dead time voltage limit value, in response to the voltage command being a positive number and the dead time voltage limit value being a negative number.

The calculator may include: a first calculator configured to output a motor applied voltage by performing a subtraction operation on the command voltage and the dead time voltage; a second calculator configured to subtract the motor resistance voltage and the motor inductance voltage from the motor applied voltage; and a third calculator configured to calculate the motor speed by dividing an output value of the second calculator by the motor counter electro-motive force constant.

The apparatus may further include a noise remover configured to estimate a final motor speed by removing noise from the motor speed as calculated by the calculator.

The limiter may include: a torque current converter configured to convert the torque command into the current command; a current limit value calculator configured to receive the motor speed and the DC link voltage, and calculate a current command limit value; and a current command outputter configured to limit a magnitude of the current command by using the current command as output from the torque current converter and the current command limit value as calculated by the current limit value calculator.

The current limit value calculator may include: a first current limit value calculator configured to calculate a positive current limit value by subtracting a counter electro-motive force based on the motor speed from a positive DC link voltage, and dividing a resultant value of the subtracting of the counter electro-motive force from the positive DC link voltage by motor resistance; and a second current limit value calculator configured to calculate a negative current limit value by subtracting the counter electro-motive force based on the motor speed from a negative DC link voltage, and dividing the resultant value of the subtracting of the counter electro-motive force from the negative DC link voltage by the motor resistance.

The apparatus may be included in a motor driven power steering system.

In another general aspect, a method with motor speed estimation includes: estimating, by a motor speed estimator, a motor speed based on a DC link voltage for driving a motor, a motor current flowing through the motor, and a voltage command; and generating, by a limiter, a current command based on the estimated motor speed, a torque command, and the DC link voltage.

The estimating of the motor speed may include: calculating, by a dead time voltage calculator, a dead time voltage using the voltage command, the DC link voltage, and a motor current; calculating, by a motor resistance and inductance voltage calculator, a motor resistance voltage by resistance of the motor, and a motor inductance voltage by inductance of the motor; and calculating, by a calculator, the motor speed based on the dead time voltage, the voltage command, the motor resistance voltage, the motor inductance voltage, and a preset motor counter electro-motive force constant.

The calculating of the dead time voltage may include: calculating, by the dead time voltage calculator, a dead time voltage limit value by applying a sign of the motor current, the DC link voltage, and a dead time ratio within a switching period; and determining, by the dead time voltage calculator, a dead time voltage according to states of the dead time voltage limit value and the voltage command.

The calculating of the dead time voltage limit value may include calculating the dead time voltage limit value by multiplying the sign of the motor current, the DC link voltage, and the dead time ratio.

The determining of the dead time voltage may include: determining the dead time voltage as a value of the voltage command, in response to an absolute value of the voltage command being less than an absolute value of the dead time voltage limit value; determining the dead time voltage as a positive dead time voltage limit value, in response to the absolute value of the voltage command not being less than the absolute value of the dead time voltage limit value, and both of the voltage command and the dead time voltage limit value being positive numbers; determining the dead time voltage as a negative dead time voltage limit value, in response to the absolute value of the voltage command not being less than the absolute value of the dead time voltage limit value, and both of the voltage command and the dead time voltage limit value being negative numbers; determining the dead time voltage as a positive dead time voltage limit value, in response to the voltage command being a negative number and the dead time voltage limit value being a positive number, and determining the dead time voltage as a negative dead time voltage limit value, in response to the voltage command being a positive number and the dead time voltage limit value being a negative number.

The calculating of the motor speed may include: outputting, by the calculator, a motor applied voltage by performing a subtraction operation on the command voltage and the dead time voltage; and calculating, by the calculator, the motor speed by subtracting the motor resistance voltage and the motor inductance voltage from the motor applied voltage, and dividing, by the calculator, a resultant value of the subtracting of the motor resistance voltage and the motor inductance voltage from the motor applied voltage by the motor counter electro-motive force constant.

The method may further include estimating, by a noise remover, a final motor speed by removing noise from the motor speed as calculated by the calculation unit.

The generating of the current command may include: converting, by a torque current converter, the torque command into the current command; receiving, by a current limit value calculator, the motor speed and the DC link voltage, and calculating, by the current limit value calculator, a current command limit value; and limiting, by a current command outputter, the magnitude of the current command by using the current command as output from the torque current converter and the current command limit value as calculated by the current limit value calculator.

The calculating of the current command limit value may include: calculating a positive current limit value by subtracting a counter electro-motive force based on the motor speed from a positive DC link voltage, and dividing a resultant value of the subtracting of the counter electro-motive force from the positive DC link voltage by motor resistance; and calculating a negative current limit value by subtracting the counter electro-motive force based on the motor speed from a negative DC link voltage, and dividing a resultant value of the subtracting of the counter electro-motive force from the negative DC link voltage by the motor resistance.

The motor may be a DC motor in a motor driven power steering system.

Other features and aspects will be apparent from the following detailed description, the drawings, and the claims.

DETAILED DESCRIPTION OF THE ILLUSTRATED EMBODIMENTS

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for estimating the speed of a DC motor in an MDPS (Motor Driven Power Steering) system will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor includes a communication device, such as a computer, a cell phone, a PDA (Personal Digital Assistant) and another device, which can facilitate information communication between end users.

Figure 1:
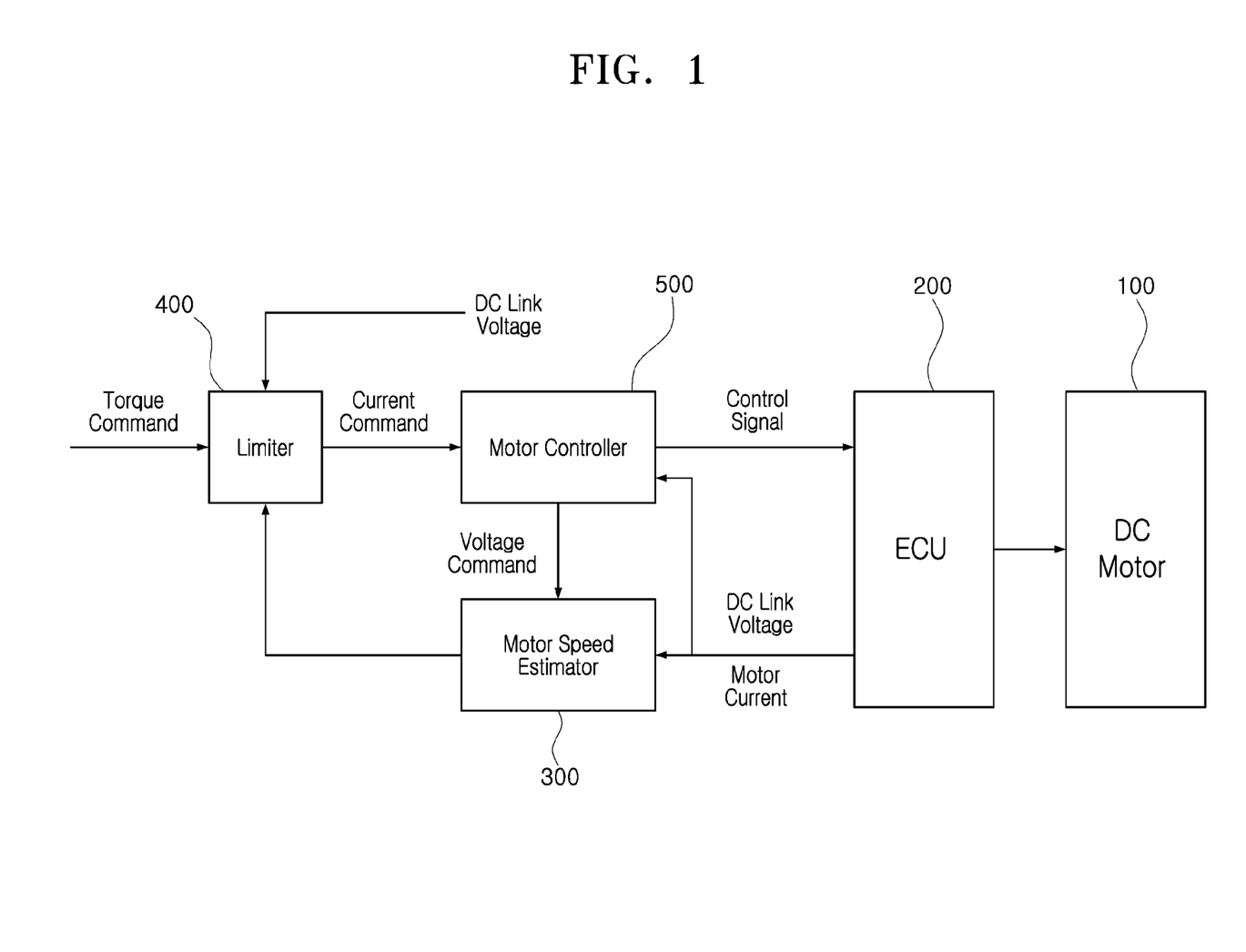
FIG. 1 is a diagram for describing an apparatus for estimating the speed of a DC motor in an MDPS (Motor Driven Power Steering) system in accordance with an embodiment of the present disclosure.
Figure 2:
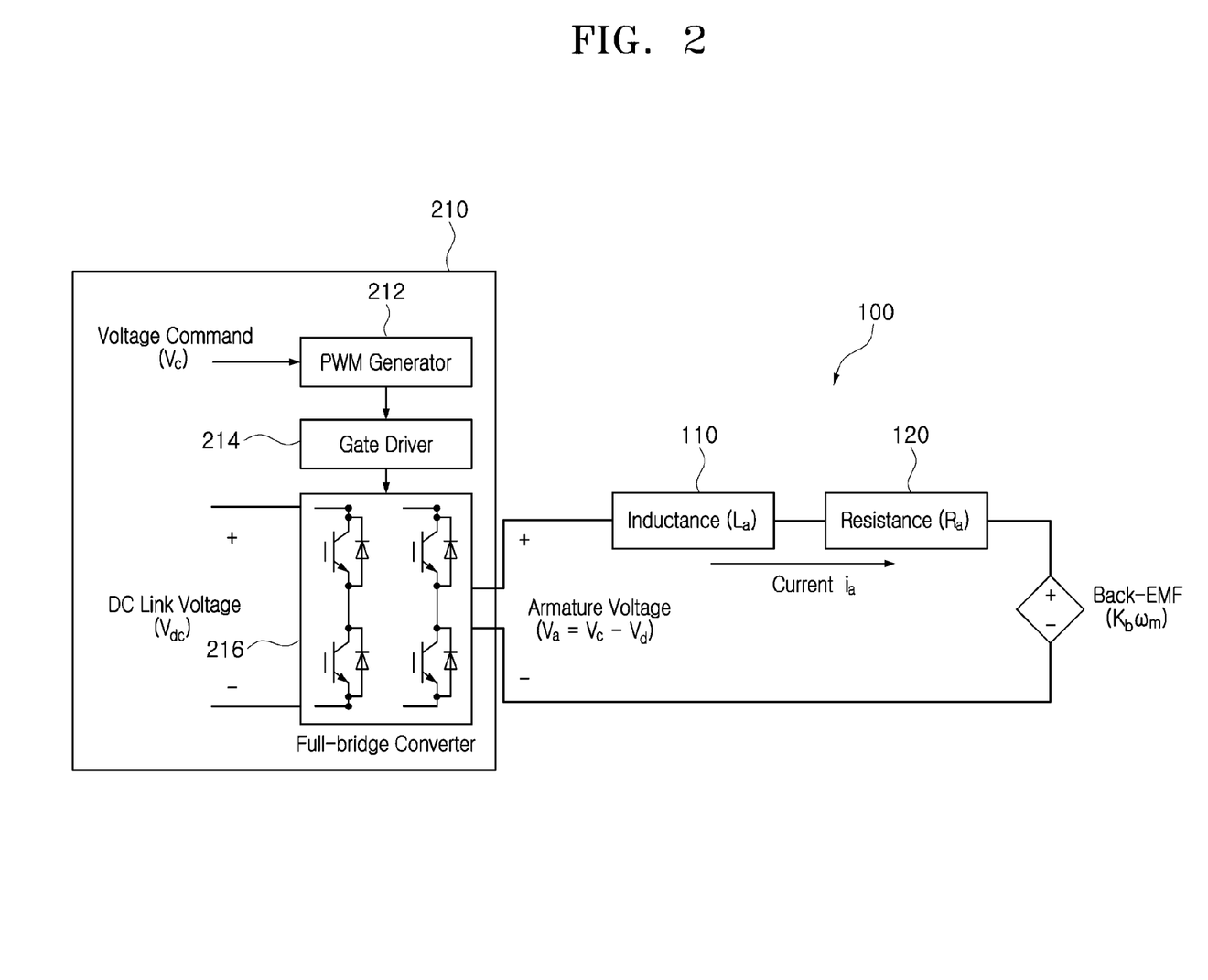
FIG. 2 is a diagram for describing a DC motor and a motor driving unit in an ECU (Electronic Control Unit) illustrated in FIG. 1.
Figure 3:
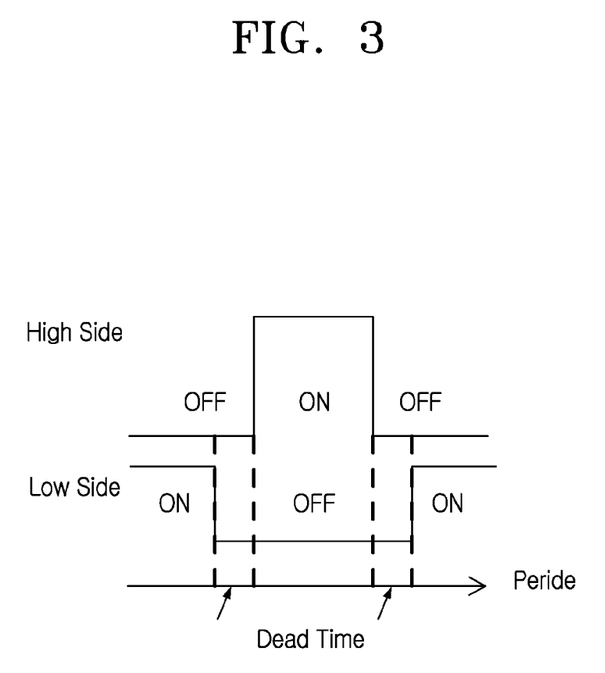
FIG. 3 is a diagram for describing a dead time in accordance with the embodiment of the present disclosure.
Figure 4:
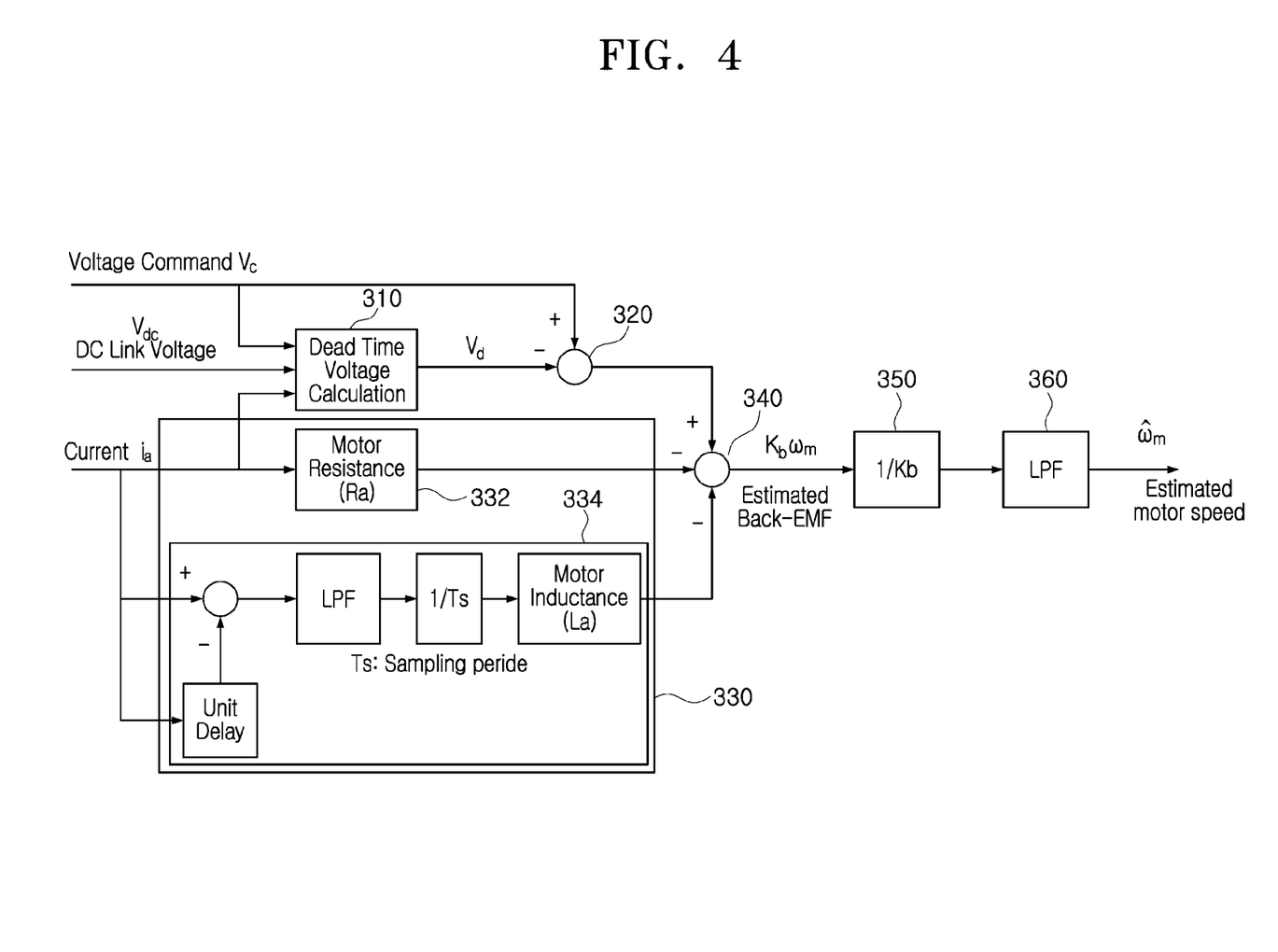
FIG. 4 is a diagram for describing a motor speed estimator illustrated in FIG. 1.
Figure 5:
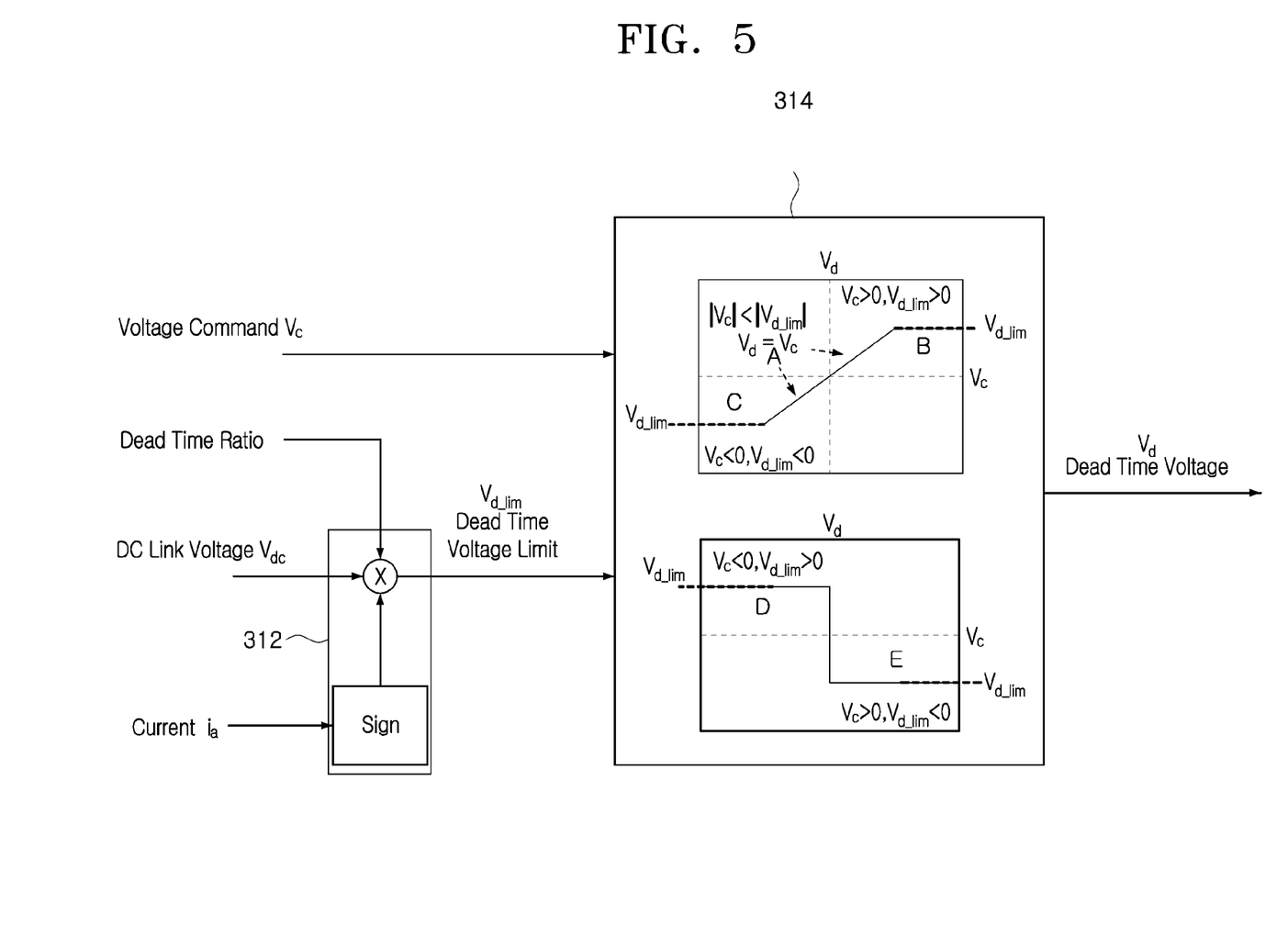
FIG. 5 is a diagram for describing a dead time voltage calculation unit illustrated in FIG. 4.
Figure 6:
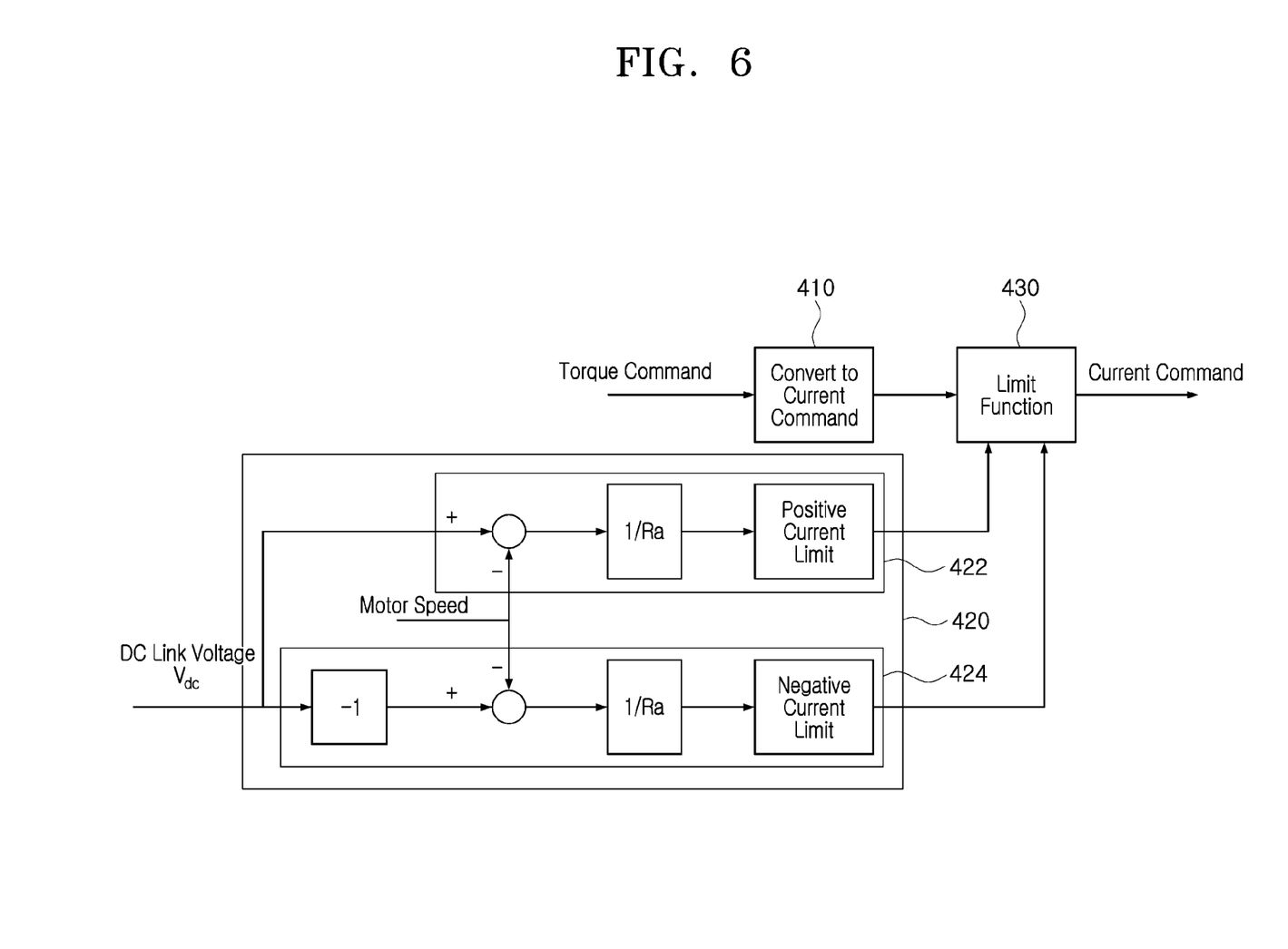
FIG. 6 is a diagram for describing a limiter illustrated in FIG. 1.
Figure 7:
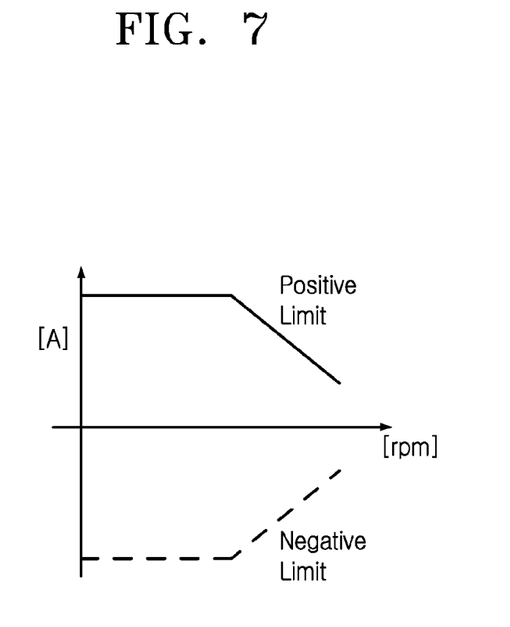
FIG. 7 is a graph for describing a current limit value by a current limit value calculation unit 420 illustrated in FIG. 6.

FIG. 1 is a diagram for describing an apparatus for estimating the speed of a DC motor in an MDPS (Motor Driven Power Steering) system in accordance with an embodiment of the present disclosure, FIG. 2 is a diagram for describing a DC motor and a motor driving unit in an ECU (Electronic Control Unit) illustrated in FIG. 1, FIG. 3 is a diagram for describing a dead time in accordance with the embodiment of the present disclosure, FIG. 4 is a diagram for describing a motor speed estimator illustrated in FIG. 1, FIG. 5 is a diagram for describing a dead time voltage calculation unit illustrated in FIG. 4, FIG. 6 is a diagram for describing a limiter illustrated in FIG. 1, and FIG. 7 is a graph for describing a current limit value by a current limit value calculation unit 420 illustrated in FIG. 6.

Referring to FIG. 1, the apparatus for estimating the speed of a DC motor in an MDPS system in accordance with the embodiment of the present disclosure includes a DC motor 100, an ECU 200, a motor speed estimator 300, a limiter 400 and a motor controller 500.

The DC motor 100 is installed on a steering shaft, and operated by a voltage applied from the ECU 200. In the present embodiment, a motor may be the DC motor 100. However, the present disclosure is not limited to the above-described embodiment.

The ECU 200 measures a DC link voltage $V_{dc}$ and a motor current flowing through the DC motor 100. The ECU 200 may transmit the measured DC link voltage and motor current to the motor speed estimator 300, and transmit the DC link voltage to the motor controller 500.

The ECU 200 may receive a voltage command from the motor controller 500, and drive the DC motor 100. Thus, the ECU 200 may include a motor driving unit 210 illustrated in FIG. 2. Referring to FIG. 2, the motor driving unit 210 may include a PWM generator 212, a gate driver 214 and a converter 216.

The PWM generator 212 may calculate the duty ratio of the DC motor 100 according to the voltage command, and generate a PWM pulse for applying a voltage to the DC motor 100. The PWM generator 212 may transmit the PWM pulse to the converter 216 through the gate driver 214.

The converter 216 may turn on/off a plurality of switching elements according to the PWM signal generated by the PWM generator 212, in order to provide the DC motor 100 with DC power inputted from a power supply unit or battery (not illustrated). That is, the converter 216 may apply the DC link voltage to the DC motor 100 according to the PWM signal, in order to drive the DC motor 100. Such a converter 216 may include a plurality of power switching elements, and drive the DC motor 100 using an F-bridge circuit, for example.

The converter 216 has an output voltage which is determined by complementary switching operations of two power switching elements (for example, IGBT) at the top and bottom thereof. At this time, when the two power switching elements are turned on, a short circuit fault may occur. Thus, the two power switching elements may be turned on with a slight time difference therebetween as illustrated in FIG. 3. Such a slight time difference is referred to as a dead time. Thus, the converter 216 may apply a voltage, corresponding to a difference between a voltage command $V_c$ and a dead time voltage $V_d$, to the DC motor 100.

When the DC motor 100 is expressed as an equivalent circuit, the equivalent circuit may be implemented as resistance $R_a$ 120 and inductance $L_a$ 110 which are motor parameters, as illustrated in FIG. 2. When the equivalent circuit of the DC motor 100 is used, a relationship with a voltage applied from the motor driving unit 210 may be recognized. That is, the voltage applied from the motor driving unit 210 may be equal to a motor voltage generated by the equivalent circuit of the DC motor 100. This may be expressed as Equation 1 below.

$$v_a = v_c - v_d = R_1 i_a + L_a \frac{di_a}{dt} + K_b \omega_m \quad \text{[Equation 1]}$$

In Equation 1, $v_a$ may represent the applied voltage, $V_c$ may represent the voltage command, $v_d$ may represent the dead time voltage, $R_a$ may represent the motor resistance 120, is may represent the motor current, $L_a$ may represent the motor inductance 110, $K_b$ may represent a motor counter electro-motive force constant, and (Om may represent the motor speed.

In Equation 1, the voltage command, the motor resistance 120, the motor current, the motor inductance 110 and the motor counter electro-motive force constant may be predetermined or calculated values. However, the dead time voltage and the motor speed are not determined values, and thus need to be calculated.

Thus, the motor speed estimator 300 estimates the motor speed based on the DC link voltage for driving the DC motor 100, a motor current measured form the DC motor 100, and a voltage command.

That is, the motor speed estimator 300 may receive the DC link voltage and the motor current from the ECU 200, receive the voltage command from the motor controller 500, and estimate the motor speed using the received DC link voltage, motor current and voltage command. The motor speed estimator 300 may estimate the motor speed $\omega_m$ using Equation 2 below.

$$\omega_m = \frac{1}{K_b}\left(v_c - v_d - R_a i_a - L_a \frac{di_a}{dt}\right) \quad \text{[Equation 2]}$$

Equation 2 is obtained by converting Equation 1 into an equation of the motor speed.

Therefore, the motor speed estimator 300 may estimate the motor speed using the dead time voltage generated by the motor driving unit 210 and the voltage determined by the motor resistance 120 and the motor inductance 110.

Referring to FIG. 4, the motor speed estimator 300 may include a dead time voltage calculation unit 310, a first calculation unit 320, a motor resistance and inductance voltage calculation unit 330, a second calculation unit 340, a third calculation unit 350 and a noise removing unit 360.

The dead time voltage calculation unit 310 may calculate the dead time voltage using the voltage command, the DC link voltage and the motor current.

Referring to FIG. 5, the dead time voltage calculation unit 310 includes a dead time voltage limit value calculator 312 and a dead time voltage determiner 314.

The dead time voltage limit value calculator 312 may calculate a dead time voltage limit value $V_{d\_lim}$ by applying the direction (sign) of the motor current, the DC link voltage and a dead time ratio within a switching period. At this time, the dead time ratio may be a predetermined value.

For example, the dead time voltage limit value calculator 312 may calculate the dead time voltage limit value $V_{d\_lim}$ by multiplying the direction (sign) of the motor current, the DC link voltage and the dead time ratio within the switching period.

The dead time voltage determiner 314 may determine the dead time voltage $V_d$ according to the states of the voltage command $V_c$ and the dead time voltage limit value $V_{d\_lim}$.

For example, when the absolute value of the voltage command $V_c$ is smaller than the absolute value of the dead time voltage limit value $V_{d\_lim}$, the dead time voltage determiner 314 may determine the dead time voltage $V_d$ as a value equal to the voltage command as indicated by 'A'. Furthermore, when both of the voltage command $V_c$ and the dead time voltage limit value $V_{d\_lim}$ exceed '0' or are positive numbers, the dead time voltage determiner 314 may determine the dead time voltage $V_d$ as a positive dead time voltage limit value $+V_{d\_lim}$ as indicated by 'B'. Furthermore, when both of the voltage command $V_c$ and the dead time voltage limit value $V_{d\_lim}$ are less than '0' or are negative numbers, the dead time voltage determiner 314 may determine the dead time voltage $V_d$ as a negative dead time voltage limit value $-V_{d\_lim}$ as indicated by 'C'. Furthermore, when the voltage command $V_c$ is less than '0' or is a negative number and the dead time voltage limit value $V_{d\_lim}$ exceeds '0' or is a positive number, the dead time voltage determiner 314 may determine the dead time voltage $V_d$ as the positive dead time voltage limit value $+V_{d\_lim}$ as indicated by 'D'. Furthermore, when the voltage command $V_c$ exceeds '0' or is a positive number and the dead time voltage limit value $V_{d\_lim}$ is less than '0' or is a negative number, the dead time voltage determiner 314 may determine the dead time voltage $V_d$ as the negative dead time voltage limit value $-V_{d\_lim}$ as indicated by 'E'.

The first calculation unit 320 calculates a motor applied voltage $v_a$ using the voltage command and the dead time voltage. That is, the first calculation unit 320 may output the motor applied voltage $v_a$ by performing a subtraction operation on the voltage command and the dead time voltage.

The motor resistance and inductance voltage calculation unit 330 may calculate a voltage determined by the motor resistance 120 and the motor inductance 110 in the motor equivalent circuit. Thus, the motor resistance and inductance voltage calculation unit 330 may include a motor resistance voltage calculator 332 and a motor inductance voltage calculator 334.

The motor resistance voltage calculator 332 may calculate a motor resistance voltage using the motor resistance 120 and the motor current. That is, the motor resistance voltage calculator 332 may calculate a motor resistance voltage by multiplying the motor resistance $R_a$ 120 and a motor current $i_a$.

The motor inductance voltage calculator 334 may calculate a motor inductance voltage by reflecting the influence of the motor inductance 110. The motor inductance voltage calculator 334 may calculate the motor inductance voltage by differentiating the motor current through a unit delay, a subtractor, an LPF and 1/Ts, and multiplying the differentiated motor current $$L_a \frac{di_a}{dt}$$

by the motor inductance $L_a$ 110.

For example, in the case of the motor equivalent circuit of FIG. 2, the motor resistance voltage calculator 332 may calculate the motor resistance voltage such as $R_a L_a$, and the motor inductance voltage calculator 334 may calculate the motor inductance voltage such as $$L_a \frac{di_a}{dt}.$$

The second calculation unit 340 may perform a subtraction operation on the motor applied voltage calculated by the first calculation unit 320, the motor resistance voltage calculated by the motor resistance voltage calculator 332, and the motor inductance voltage calculated by the motor inductance voltage calculator 334. That is, the second calculation unit 340 may subtract the motor resistance voltage and the motor inductance voltage from the motor applied voltage.

The third calculation unit 350 may calculate the motor speed by dividing an output value of the second calculation unit 340 by a preset counter electro-motive force constant. At this time, since the calculated motor speed may contain noise, the noise needs to be removed.

Thus, the noise removing unit 360 may remove noise from the motor speed calculated by the third calculation unit 350. At this time, the noise removing unit 360 may be implemented as an LPF.

The limiter 400 limits the magnitude of a current command inputted to the motor controller, using the motor speed estimated by the motor speed estimator 300.

The limiter 400 converts a torque command into the current command, receives the DC link voltage and the motor speed estimated by the motor speed estimator 300, calculates a current command limit value, and outputs the limited current command. The torque command may be received from MDPS control logic.

Referring to FIG. 6, the limiter 400 includes a torque current conversion unit (Convert to Current Command) 410, a current limit value calculation unit 420 and a current command output unit (Limit Function) 430.

The torque current conversion unit 410 may convert the torque command into the current command. That is, since torque is proportional to the product of magnetic flux and current and the magnetic flux has a fixed value depending on motors, the torque current conversion unit 410 may convert the torque command into the current command.

The current limit value calculation unit 420 receives the DC link voltage and the motor speed estimated by the motor speed estimator 300, and calculates the current command limit value. At this time, the current limit value calculation unit 420 may calculate a positive current limit value and a negative current limit value.

Thus, the current limit value calculation unit 420 may include a first current limit value calculator 422 configured to calculate the positive current limit value and a second current limit value calculator 424 configured to calculate the negative current limit value.

The first current limit value calculator 422 may calculate the positive current limit value by subtracting a counter electro-motive force, into which the motor speed is reflected, from the positive DC link voltage, and dividing the resultant value by the motor resistance 120. That is, the first current limit value calculator 422 may calculate the positive current limit value $i_{a\_lim}$ using Equation 3 below.

$$+i_{a\_lim}=(V_{dc}-K_b\omega_m)/R_a \quad \text{[Equation 3]}$$

Then, the first current limit value calculator 422 may calculate the positive current limit value such as a positive limit illustrated in FIG. 7.

The second current limit value calculator 424 may calculate the negative current limit value by subtracting the counter electro-motive force, into which the motor speed is reflected, from the negative DC link voltage, and dividing the resultant value by the motor resistance 120. That is, the second current limit value calculator 424 may calculate a negative current limit value $-i_{a\_lim}$ using Equation 4 below.

$$-i_{a\_lim}=(-V_{dc}-K_b\omega_m)/R_a \quad \text{[Equation 4]}$$

Then, the second current limit value calculator 424 may calculate the negative current limit value such as a negative limit illustrated in FIG. 7.

The current command output unit 430 may output a final current command using the current command outputted from the torque current conversion unit 410 and the current command limit value calculated by the current limit value calculation unit 420. That is, the current command output unit 430 may limit the magnitude of the current command such that the current command outputted from the torque current conversion unit 410 is included in the range of the current command limit value. For example, when the current command exceeds the current command limit value, the current command output unit 430 may output the corresponding current command as the current command limit value.

The motor controller 500 receives the current command and the DC link voltage from the limiter 400 and the ECU 200, respectively, and outputs a voltage command for operating the DC motor.

As described above, the MDPS system using the DC motor 100 may estimate the motor speed using the voltage command and the motor current.

Figure 8:
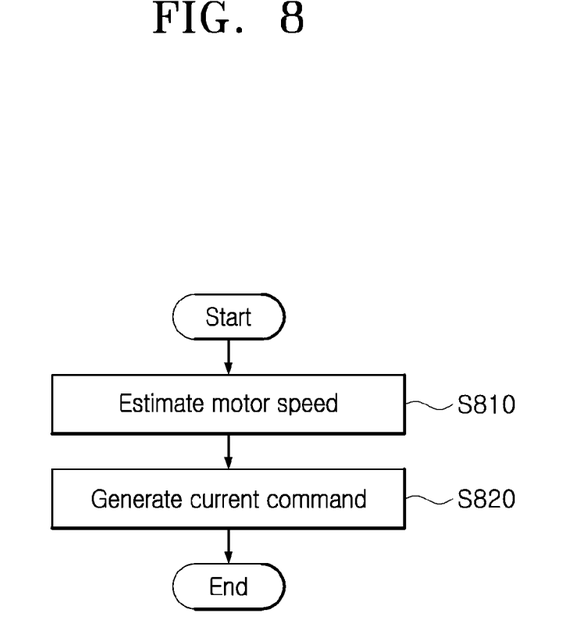
FIG. 8 is a flowchart for describing a method for estimating the speed of a DC motor in an MDPS system in accordance with an embodiment of the present disclosure.

FIG. 8 is a flowchart for describing a method for estimating the speed of a DC motor in an MDPS system in accordance with an embodiment of the present disclosure.

Referring to FIG. 8, the motor speed estimator 300 estimates a motor speed based on a DC link voltage for driving the DC motor 100, a motor current flowing through the DC motor 100, and a voltage command, in step S810. The method in which the motor speed estimator 300 estimates the motor speed will be described in more detail with reference to FIG. 9.

When step S810 is performed, the limiter 400 generates a current command based on the estimated motor speed, a torque command and the DC link voltage, in step S820. The method in which the limiter 400 generates the current command will be described in detail with reference to FIG. 10.

Figure 9:
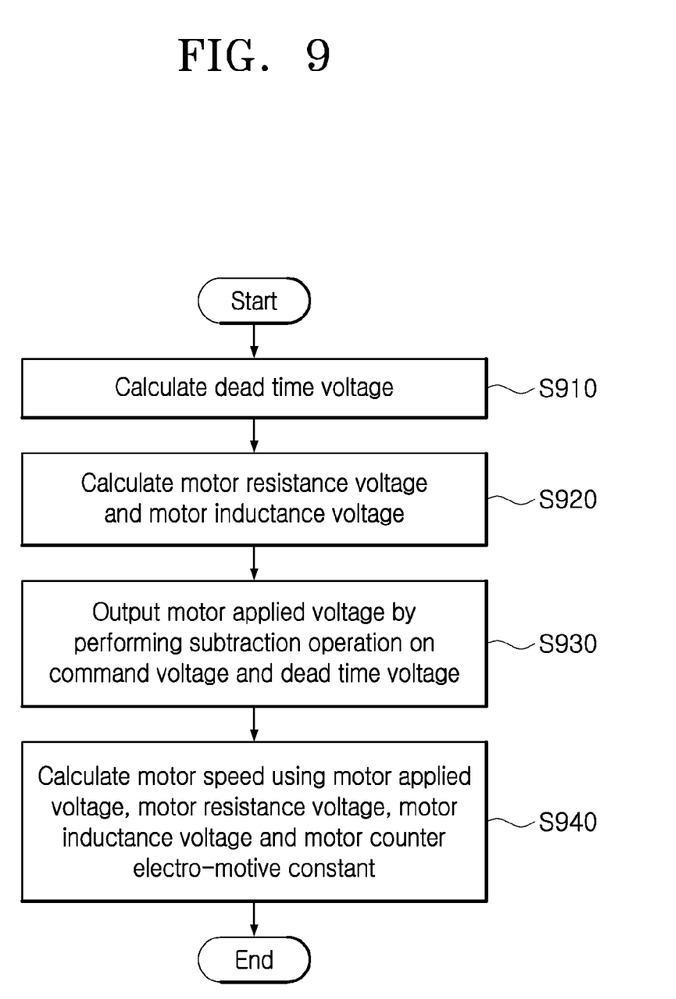
FIG. 9 is a flowchart for describing a method in which the motor speed estimator estimates a motor speed, in accordance with the embodiment of the present disclosure.

FIG. 9 is a flowchart for describing the method in which the motor speed estimator estimates the motor speed, in accordance with the embodiment of the present disclosure.

Referring to FIG. 9, the dead time voltage calculation unit 310 calculates a dead time voltage using the voltage command, the DC link voltage and the motor current in step S910. That is, the dead time voltage calculation unit 310 may calculate a dead time voltage limit value by applying the sign of the motor current, the DC link voltage and a dead time ratio within a switching period. Then, the dead time voltage calculation unit 310 may determine a dead time voltage according to the states of the dead time voltage limit value and the voltage command.

When step S910 is performed, the motor resistance and inductance voltage calculation unit 330 calculates a motor resistance voltage by the resistance 120 of the DC motor 100, and calculates a motor inductance voltage by the inductance 110 of the DC motor 100, in step S920.

When step S920 is performed, a calculation unit outputs a motor applied voltage by performing a subtraction operation on the command voltage and the dead time voltage, in step S930.

When step S930 is performed, the calculation unit calculates a motor speed using the motor applied voltage, the motor resistance voltage, the motor inductance voltage and a motor counter electro-motive force constant, in step S940. That is, the calculation unit may calculate the motor speed by subtracting the motor resistance voltage and the motor inductance voltage from the motor applied voltage, and dividing the resultant value by the motor counter electro-motive force constant.

Figure 10:
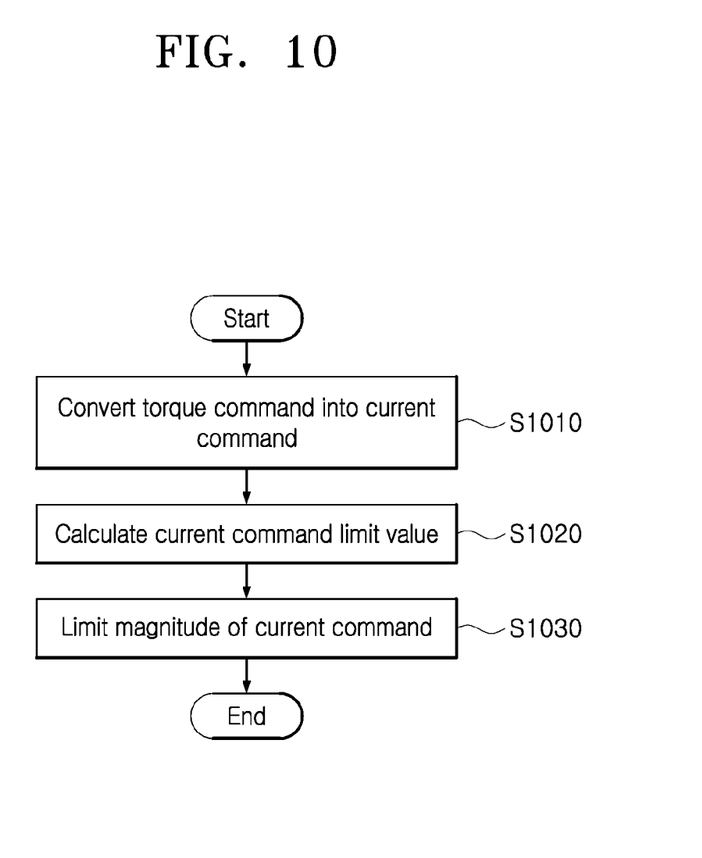
FIG. 10 is a flowchart for describing a method in which the limiter generates a current command, in accordance with the embodiment of the present disclosure.

FIG. 10 is a flowchart for describing the method in which the limiter generates a current command, in accordance with the embodiment of the present disclosure.

Referring to FIG. 10, the torque current conversion unit 410 converts a torque command into a current command in step S1010, and the current limit value calculation unit 420 receives the motor speed and the DC link voltage, and calculates a current command limit value, in step S1020. At this time, the current limit value calculation unit 420 may calculate a positive current limit value by subtracting a counter electro-motive force, based on the motor speed, from the positive DC link voltage, and dividing the resultant value by the motor resistance 120. Furthermore, the current limit value calculation unit 420 may calculate a negative current limit value by subtracting the counter electro-motive force, based on the motor speed, from the negative DC link voltage, and dividing the resultant value by the motor resistance 120.

When step S1020 is performed, the current command output unit 430 limits the magnitude of the current command using the current command outputted from the torque current conversion unit 410 and the current command limit value calculated by the current limit value calculation unit 420, in step S1030.

As described above, the apparatus and method for estimating the speed of the DC motor 100 in the MDPS system in accordance with one aspect of the present disclosure may estimate the motor speed using the voltage command and the measured motor current, and thus require no voltage measurement circuit, thereby reducing the cost.

Furthermore, the apparatus and method for estimating the speed of the DC motor 100 in the MDPS system in accordance with another aspect of the present disclosure may estimate the motor speed by considering the dynamic state of the motor 100 and the dead time voltage generated by the PWM generator 212, thereby raising the accuracy of the motor speed estimation.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus with motor speed estimation, the apparatus comprising:
a motor speed estimator configured to estimate a motor speed based on a DC link voltage for driving a motor, a motor current flowing through the motor, and a voltage command; and
a limiter configured to generate a current command based on the estimated motor speed, a torque command, and the DC link voltage, wherein the motor speed estimator comprises:
a dead time voltage calculator configured to calculate a dead time voltage using the voltage command, the DC link voltage, and a motor current;
a motor resistance and inductance voltage calculator configured to calculate a motor resistance voltage by resistance of the motor, and calculate a motor inductance voltage by inductance of the motor; and
a calculator configured to calculate the motor speed based on the dead time voltage, the voltage command, the motor resistance voltage, the motor inductance voltage, and a preset motor counter electro-motive force constant.

2. The apparatus of claim 1, wherein the dead time voltage calculator comprises:
a dead time voltage limit value calculator configured to calculate a dead time voltage limit value by applying a sign of the motor current, the DC link voltage, and a dead time ratio within a switching period; and
a dead time voltage determiner configured to determine a dead time voltage according to states of the dead time voltage limit value and the voltage command.

3. The apparatus of claim 1, wherein the calculator comprises:
a first calculator configured to output a motor applied voltage by performing a subtraction operation on the command voltage and the dead time voltage;
a second calculator configured to subtract the motor resistance voltage and the motor inductance voltage from the motor applied voltage; and
a third calculator configured to calculate the motor speed by dividing an output value of the second calculator by the motor counter electro-motive force constant.

4. The apparatus of claim 1, further comprising a noise remover configured to estimate a final motor speed by removing noise from the motor speed as calculated by the calculator.

5. The apparatus of claim 2, wherein the dead time voltage limit value calculator is further configured to calculate the dead time voltage limit value by multiplying the sign of the motor current, the DC link voltage, and the dead time ratio.

6. The apparatus of claim 2, wherein the dead time voltage determiner is further configured to:
determine the dead time voltage as a value of the voltage command, in response to an absolute value of the voltage command being less than an absolute value of the dead time voltage limit value;
determine the dead time voltage as a positive dead time voltage limit value, in response to the absolute value of the voltage command not being less than the absolute value of the dead time voltage limit value, and both of the voltage command and the dead time voltage limit value being positive numbers;
determine the dead time voltage as a negative dead time voltage limit value, in response to the absolute value of the voltage command not being less than the absolute value of the dead time voltage limit value, and both of the voltage command and the dead time voltage limit value being negative numbers;
determine the dead time voltage as a positive dead time voltage limit value, in response to the voltage command being a negative number and the dead time voltage limit value being a positive number; and
determine the dead time voltage as a negative dead time voltage limit value, in response to the voltage command being a positive number and the dead time voltage limit value being a negative number.

7. An apparatus for estimating speed of a DC motor in a motor driven power steering (MDPS) system, the apparatus comprising:

a motor speed estimator configured to estimate a motor speed based on a DC link voltage for driving the DC motor, a motor current flowing through the DC motor, and a voltage command; and a limiter configured to generate a current command based on the estimated motor speed, a torque command, and the DC link voltage, wherein the limiter comprises:

a torque current converter configured to convert the torque command into the current command;

a current limit value calculator configured to receive the motor speed and the DC link voltage, and calculate a current command limit value; and a current command outputter configured to limit a magnitude of the current command by using the current command as output from the torque current converter and the current command limit value as calculated by the current limit value calculator.

8. The apparatus of claim 7, wherein the current limit value calculator comprises:

a first current limit value calculator configured to calculate a positive current limit value by subtracting a counter electro-motive force based on the motor speed from a positive DC link voltage, and dividing a resultant value of the subtracting of the counter electro-motive force from the positive DC link voltage by motor resistance; and a second current limit value calculator configured to calculate a negative current limit value by subtracting the counter electro-motive force based on the motor speed from a negative DC link voltage, and dividing the resultant value of the subtracting of the counter electro-motive force from the negative DC link voltage by the motor resistance.

9. A method for estimating a speed of a DC motor in a motor driven power steering (MDPS) system, the method comprising:

estimating, by a motor speed estimator, a motor speed based on a DC link voltage for driving the DC motor, a motor current flowing through the DC motor, and a voltage command; and generating, by a limiter, a current command based on the estimated motor speed, a torque command, and the DC link voltage, wherein the estimating of the motor speed comprises:

calculating, by a dead time voltage calculator, a dead time voltage using the voltage command, the DC link voltage, and a motor current;

calculating, by a motor resistance and inductance voltage calculator, a motor resistance voltage by resistance of the motor, and a motor inductance voltage by inductance of the motor; and calculating, by a calculator, the motor speed based on the dead time voltage, the voltage command, the motor resistance voltage, the motor inductance voltage, and a preset motor counter electro-motive force constant.

10. The method of claim 9, wherein the calculating of the dead time voltage comprises:

calculating, by the dead time voltage calculator, a dead time voltage limit value by applying a sign of the motor current, the DC link voltage, and a dead time ratio within a switching period; and determining, by the dead time voltage calculator, a dead time voltage according to states of the dead time voltage limit value and the voltage command.

11. The method of claim 9, wherein the calculating of the motor speed comprises:

outputting, by the calculator, a motor applied voltage by performing a subtraction operation on the command voltage and the dead time voltage; and calculating, by the calculator, the motor speed by subtracting the motor resistance voltage and the motor inductance voltage from the motor applied voltage, and dividing, by the calculator, a resultant value of the subtracting of the motor resistance voltage and the motor inductance voltage from the motor applied voltage by the motor counter electro-motive force constant.

12. The method of claim 9, further comprising estimating, by a noise remover, a final motor speed by removing noise from the motor speed as calculated by the calculation unit.

13. The method of claim 9, wherein the generating of the current command comprises:

converting, by a torque current converter, the torque command into the current command;

receiving, by a current limit value calculator, the motor speed and the DC link voltage, and calculating, by the current limit value calculator, a current command limit value; and limiting, by a current command outputter, the magnitude of the current command by using the current command as output from the torque current converter and the current command limit value as calculated by the current limit value calculator.

14. The method of claim 10, wherein the calculating of the dead time voltage limit value comprises calculating the dead time voltage limit value by multiplying the sign of the motor current, the DC link voltage, and the dead time ratio.

15. The method of claim 10, wherein the determining of the dead time voltage comprises:

determining the dead time voltage as a value of the voltage command, in response to an absolute value of the voltage command being less than an absolute value of the dead time voltage limit value;

determining the dead time voltage as a positive dead time voltage limit value, in response to the absolute value of the voltage command not being less than the absolute value of the dead time voltage limit value, and both of the voltage command and the dead time voltage limit value being positive numbers;

determining the dead time voltage as a negative dead time voltage limit value, in response to the absolute value of the voltage command not being less than the absolute value of the dead time voltage limit value, and both of the voltage command and the dead time voltage limit value being negative numbers;

determining the dead time voltage as a positive dead time voltage limit value, in response to the voltage command being a negative number and the dead time voltage limit value being a positive number, and determining the dead time voltage as a negative dead time voltage limit value, in response to the voltage command being a positive number and the dead time voltage limit value being a negative number.

16. The method of claim 13, wherein the calculating of the current command limit value comprises:

calculating a positive current limit value by subtracting a counter electro-motive force based on the motor speed from a positive DC link voltage, and dividing a resultant value of the subtracting of the counter electro-motive force from the positive DC link voltage by motor resistance; and calculating a negative current limit value by subtracting the counter electro-motive force based on the motor speed from a negative DC link voltage, and dividing a resultant value of the subtracting of the counter electro-motive force from the negative DC link voltage by the motor resistance.

\* \* \* \* \*